W. B. HIGGINS.
Carriage Spring.
No. 77,880.
Patented May 12, 1868.
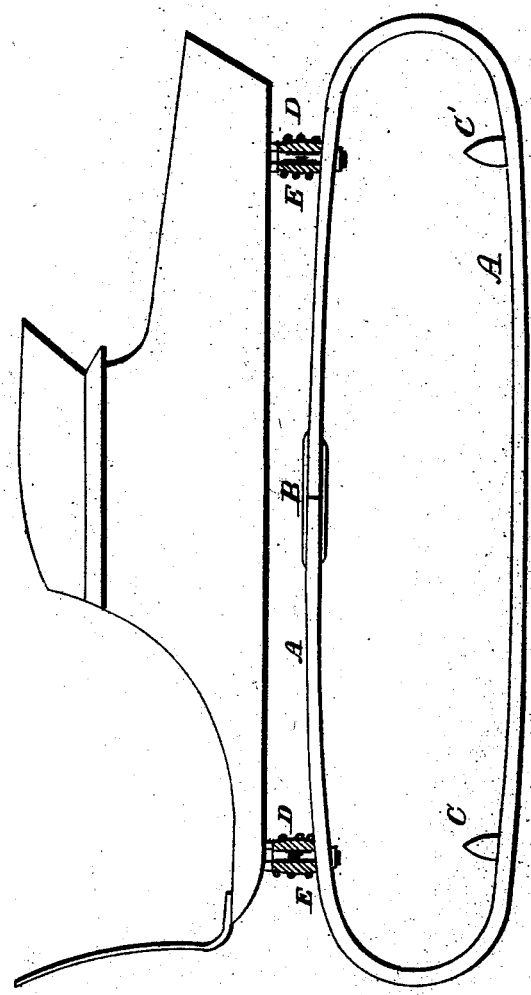

United States Patent Office.

WALTER B. HIGGINS, OF SAN FRANCISCO, CALIFORNIA.

Letters Patent No. 77,880, dated May 12, 1868.

IMPROVEMENT IN CARRIAGE-SPRINGS.

*The Schedule referred to in these Letters Patent and making part of the same.*

TO ALL WHOM IT MAY CONCERN:

Be it known that I, WALTER B. HIGGINS, of the city and county of San Francisco, State of California, have invented an Improved Carriage-Spring; and I do hereby declare the following description and accompanying drawings are sufficient to enable any person skilled in the art or science to which it most nearly appertains to make and use my said invention or improvement without further invention or experiment.

The principal object of my invention is to simply construct and attach springs to single and double wagons and carriages, and consists of a continuous wooden spring, combined with other springs of a spiral or elliptic form, or of any elastic material, which are placed at the front and rear ends of the body, and connect it to the continuous wooden spring.

Referring to the drawings forming a part of this specification, which represents a side elevation, A A are the continuous wooden springs, the ends being joined together at B, where they are held by an upper and lower plate. The bolster C and clip-bar C' are attached to the upper face of the lower part of each spring, near the ends, and the clip-bar is attached by clips or other device directly to the axle.

On the top, and near the ends of the wooden springs, are placed small springs, D D. These springs are made of India rubber or other material, and are placed between the springs and the body of the carriage, where they are held in place by bolts passing through them, and secured underneath by nuts. Small elliptic springs may be used instead of the rubber, yet I do not think they would be as safe, and would be more liable to break. In case a block of rubber is used, a spiral spring, E, should be coiled around it, by which greater ease in the spring may be had. The size of the rubber block should be reduced when the spring is coiled around it.

By this device a cheap wagon-body, with a simple attachment of springs, is had, riding easily and without the liability of soon getting out of repair.

I do not claim the continuous spring A, a patent for a spring so constructed having already been granted; but What I do claim is—

The combination of the springs D D with the wooden spring A, to form the connection of the same with the body of the carriage, substantially as described.

In witness whereof, I have hereunto set my hand and seal.

WALTER B. HIGGINS. [L. S.]

Witnesses:
C. W. M. SMITH,
J. L. BOONE.